(12) United States Patent
Norris et al.

(10) Patent No.: US 8,028,513 B2
(45) Date of Patent: Oct. 4, 2011

(54) VARIABLE BYPASS TURBINE FAN

(75) Inventors: James W. Norris, Lebanon, CT (US); Craig A. Nordeen, Manchester, CT (US); Bernard J. Raver, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 980 days.

(21) Appl. No.: 11/977,874

(22) Filed: Oct. 26, 2007

(65) Prior Publication Data

US 2009/0107109 A1   Apr. 30, 2009

(51) Int. Cl.
*F02K 3/00* (2006.01)
*F02C 7/32* (2006.01)

(52) U.S. Cl. .......... 60/226.1; 60/226.3; 60/802; 415/69; 415/61

(58) Field of Classification Search ............. 60/226.1, 60/226.3, 802; 415/68, 69, 61
See application file for complete search history.

(56) References Cited

U.S. PATENT DOCUMENTS

| | | | | | |
|---|---|---|---|---|---|
| 3,620,021 | A | * | 11/1971 | Lawrie | 60/226.1 |
| 3,673,802 | A | * | 7/1972 | Krebs et al. | 60/226.1 |
| 3,900,274 | A | * | 8/1975 | Johnston et al. | 416/155 |
| 4,062,185 | A | * | 12/1977 | Snow | 60/226.1 |
| 4,428,189 | A | * | 1/1984 | Greenberg et al. | 60/226.1 |
| 5,867,979 | A | * | 2/1999 | Newton et al. | 60/226.1 |
| 6,339,927 | B1 | * | 1/2002 | DiPietro, Jr. | 60/226.1 |
| 6,378,293 | B1 | * | 4/2002 | Care et al. | 60/226.1 |
| 6,647,707 | B2 | * | 11/2003 | Dev | 60/39.43 |
| 7,770,377 | B2 | * | 8/2010 | Rolt | 60/226.1 |
| 2007/0044451 | A1 | * | 3/2007 | Jones | 60/226.1 |

* cited by examiner

*Primary Examiner* — Ted Kim
(74) *Attorney, Agent, or Firm* — Bachman & LaPointe, P.C.

(57) ABSTRACT

An engine for powering a vehicle, such as a military aircraft or a commercial aircraft, is provided. The engine broadly comprises a main core with a plurality of spools with each spool having a plurality of compressor blades and a plurality of turbine blades attached thereto. One of the spools has a first set of fan blades attached thereto. The engine further has a variable bypass turbine fan formed by a second set of fan blades. The second set of fan blades is arranged outboard of the main core. The second set of fan blades may be decoupled from the first set of fan blades.

19 Claims, 2 Drawing Sheets

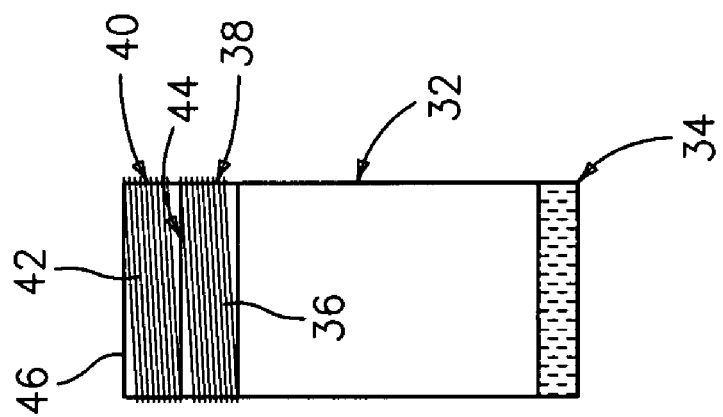
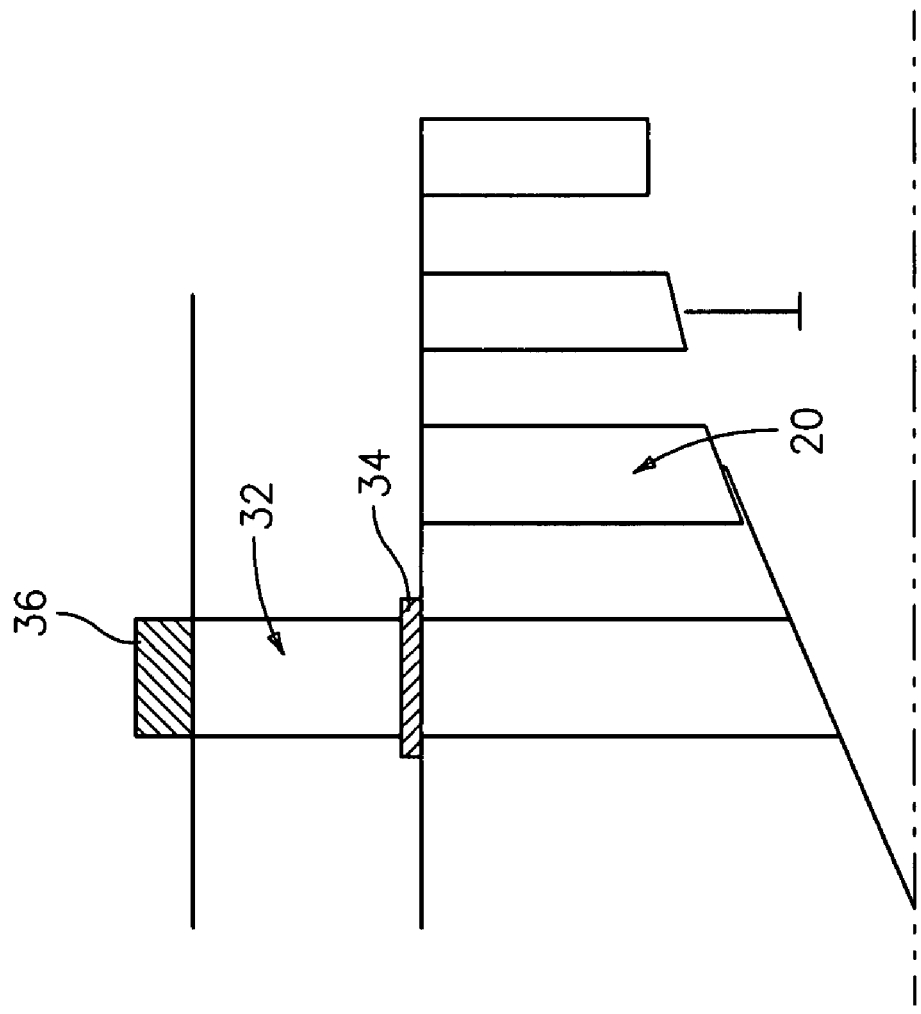
FIG. 3
FIG. 2

VARIABLE BYPASS TURBINE FAN

BACKGROUND

The instant application is related to an engine having a variable bypass turbine fan which varies the bypass ratio of the engine.

Turbine engines with high bypass ratios have good propulsive efficiency for long range cruise or loiter, but the front area can create significant drag if high speed flight is required. Low bypass turbine engines have high specific thrust, but poor fuel economy.

There is needed an engine which has the ability to vary the bypass ratio so as to improve the ability to dash at high speeds while retaining good cruise/loiter performance.

SUMMARY

Accordingly, an engine is provided which has a variable bypass turbine fan for providing improved propulsive efficiency and additional power capability for aircraft and/or weapons requirements.

An engine for powering a vehicle, such as a military aircraft or a commercial aircraft, is provided. The engine broadly comprises a main core with a plurality of spools with each spool having a plurality of compressor blades and a plurality of turbine blades attached thereto. One of the spools has a first set of fan blades attached thereto. The engine further has a variable bypass turbine fan formed by a second set of fan blades. The second set of fan blades is arranged outboard of the main core. The second set of fan blades may be decoupled from the first set of fan blades.

Other details of the variable bypass turbine fan described herein, as well as other objects and advantages attendant thereto, are set forth in the following detailed description and the accompanying drawings wherein like reference numerals depict like elements.

BRIEF DESCRIPTION OF THE DRAWINGS

FIG. 2 is an enlarged view of a portion of the engine having the variable bypass turbine fan; and FIG. 3 is an enlarged view of a turbine blade of the bypass turbine fan.

DETAILED DESCRIPTION OF THE PREFERRED EMBODIMENT(S)

Figure 1:
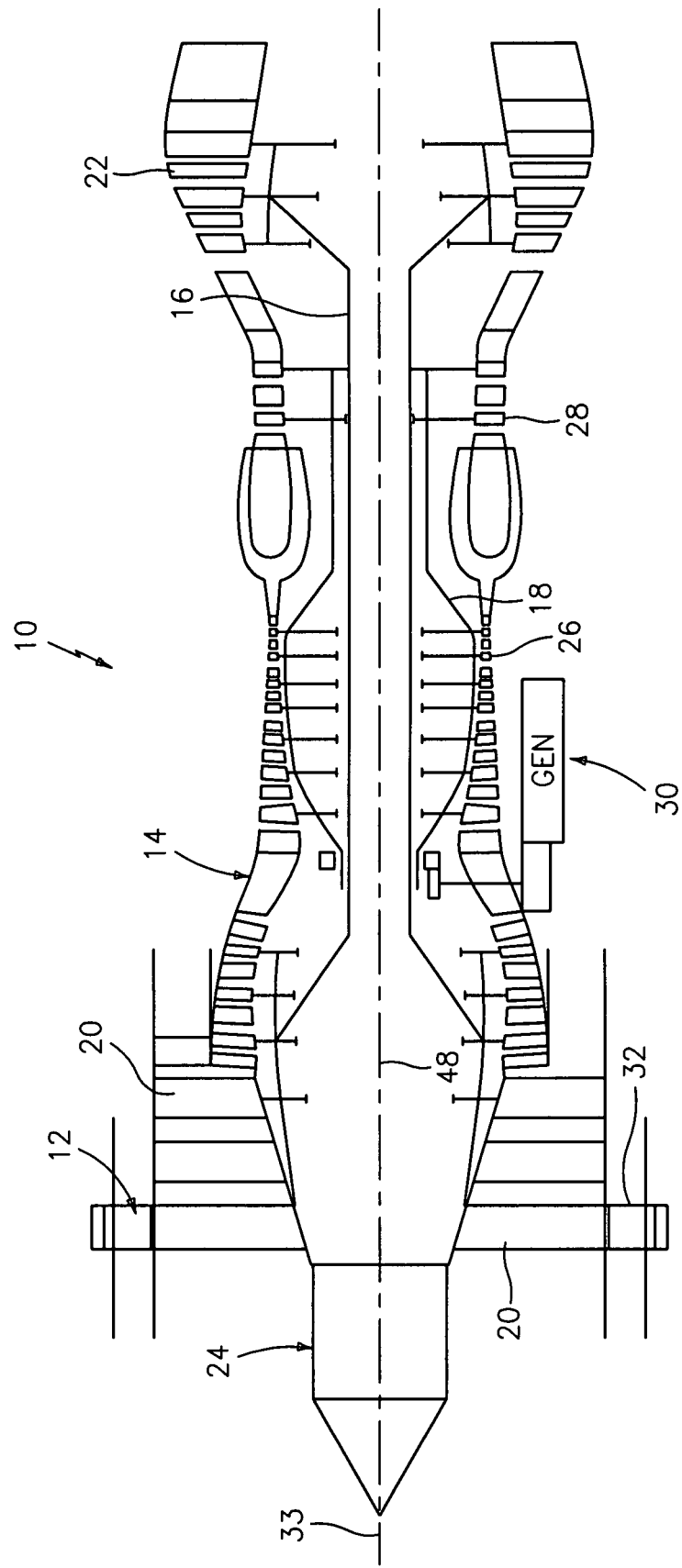
FIG. 1 is a schematic representation of an engine having a variable bypass turbine fan.

Referring now to FIG. 1, there is shown an engine 10 having a variable bypass turbine fan 12. The engine 10 has a main core 14 with a plurality of spools 16 and 18. While the engine 10 has been shown as having two spools, it could have more than two spools if desired. Similarly, engine 10 could have a single spool.

The spool 16 is a low spool and the spool 18 is the high spool. The spool 16 has a plurality of fan blades 20 and a plurality of turbine blades 22 attached to it. The fan blades 20 and the turbine blades 22 may be attached to the spool using any suitable attachment means known in the art. A generator 24 for generating electrical power may be connected to the spool 16.

The spool 18 has a plurality of compressor blades 26 and a plurality of turbine blades 28 attached to it. The compressor blades 26 and the turbine blades 28 may be attached to the spool 18 using any suitable attachment means known in the art. A generator 30 for generating electrical power may be connected to the spool 18.

The generators 24 and 30 may be used to provide electrical power to operate aircraft systems or directed energy systems.

Outboard of the main core 14 is a plurality of fan blades 32 which form a variable bypass turbine fan 12. Typically, the blades 32 are decoupled from the fan blades 20. This enables the two sets of fan blades 20 and 32 to rotate at different speeds.

If desired, as shown in FIGS. 2 and 3, the root portions of the blades 32 may be joined by an inner diameter shroud 34. Alternatively, the inner diameter shroud 34 may be omitted.

The tip portions of the blades 32 may be joined together by an outer shroud arrangement 36. The outer shroud 36 may be formed from a metallic material or a high strength composite material such as a Kevlar fiber embedded within an epoxy resin matrix or a metal matrix composite or a cellular composite.

Electrical power may be used to drive the fan blades 32 at a desired speed. As shown in FIG. 3, electrical power may be provided by a first set of electrical windings 38 embedded within the outer shroud arrangement 36 and by a second set of electrical windings 40 embedded within an additional support structure 42 located outboard of the outer shroud arrangement 36. Electrical power may be provided to the windings 38 and 40 from any suitable power source (not shown) known in the art via any suitable electrical connections (not shown) known in the art to cause the blades 32 to rotate about the axis 33.

While the outer fan blades 32 have been described as being electrically driven, they may also be hydraulically driven if desired. Any suitable hydraulic means (not shown) known in the art may be used to drive/rotate the fan blades 32.

A set of bearings 44 may be provided to permit the fan blades 32 to rotate. The bearings 44 may be mounted to or embedded in an outer surface 46 of the outer shroud arrangement 36. The bearings 44 may be magnetic bearings or air bearings.

If desired, the fan blades 32 may be configured to have the same centerline 48 as the main core 14. The centerline 48 may be coaxial with the axis 33 of rotation.

The variable bypass turbine fan 12 is a relatively low power fan which improves propulsive efficiency of the engine during loiter. When not in loiter mode, the fan 12 may be shut down or depowered and the power used to drive it could be used for other things such as power sharing between spools (which yields an operational envelope improvement), directed energy weapons, or sensors. In concept, lasers, electron beam, or microwave weapons could be powered by this arrangement. In addition, a large suite of sensors could be powered.

In cruise mode, the fan 12 may be powered which increases the bypass ratio of the engine. This increases the range of the engine and expands the envelope in which the engines can operate efficiently. The engine described herein supplies extremely efficient cruise/loiter capability as well as provide efficient propulsion at supersonic speeds.

The engine described herein may be used to power a wide variety of vehicles including, but not limited to, military and commercial aircraft.

It is apparent that there has been provided a variable bypass turbine fan which fully satisfies the objects, means, and advantages set forth hereinbefore. While the variable bypass turbine fan has been illustrated in the context of specific embodiments thereof, other unforeseeable alternatives, modifications, and variations may become apparent to those skilled in the art having read the foregoing description.

Accordingly, it is intended to embrace those alternatives, modifications, and variations as fall within the broad scope of the appended claims.

What is claimed is:

1. An engine for powering a vehicle, said engine comprising:
    a main core with a plurality of spools;
    each spool having a plurality of compressor blades and a plurality of turbine blades attached thereto;
    one of said spools having a first set of fan blades attached thereto;
    a second set of fan blades being arranged outboard of said main core and being concentric with said first set of fan blades, said first set of fan blades being axially aligned with said second set of fan blades along an axis perpendicular to a centerline of said engine; and
    said second set of fan blades being decoupled from said first set of fan blades.

2. The engine of claim 1, wherein at least one of said spools has an electrical power generator attached thereto.

3. The engine of claim 1, wherein each of said spools has an electrical power generator attached thereto.

4. The engine of claim 1, wherein root portions of said second set of fan blades are connected by an inner shroud.

5. The engine of claim 1, wherein tip portions of said second set of fan blades are connected by a first outer support structure.

6. The engine of claim 5, wherein said first outer support structure is formed by a composite material.

7. The engine of claim 6, wherein said composite material is one of a fiber wound composite, a metal matrix composite and a cellular composite.

8. The engine of claim 5, further comprising bearing means for permitting rotation of said second set of fan blades.

9. The engine of claim 8, wherein said bearing means are mounted to said first outer support structure.

10. The engine of claim 8, wherein said bearing means comprises magnetic bearings.

11. The engine of claim 8, wherein said bearing means comprises air bearings.

12. An engine for powering a vehicle, said engine comprising:
    a main core with a plurality of spools;
    each spool having a plurality of compressor blades and a plurality of turbine blades attached thereto;
    one of said spools having a first set of fan blades attached thereto;
    a second set of fan blades being arranged outboard of said main core;
    said second set of fan blades being decoupled from said first set of fan blades;
    tip portions of said second set of fan blades being connected by a first outer support structure; and
    said second set of fan blades being electrically driven and including a plurality of electrical windings in said first outer support structure.

13. An engine for powering a vehicle, said engine comprising:
    a main core with a plurality of spools;
    each spool having a plurality of compressor blades and a plurality of turbine blades attached thereto;
    one of said spools having a first set of fan blades attached thereto;
    a second set of fan blades being arranged outboard of said main core;
    said second set of fan blades being decoupled from said first set of fan blades;
    tip portions of said second set of fan blades being connected by a first outer support structure; and
    an additional support structure located outboard of said first support structure and said additional support structure containing electrical windings.

14. An engine comprising:
    a main core having a first set of fan blades for providing thrust;
    a second set of fan blades forming a variable bypass turbine fan;
    said second set of fan blades being concentric and axially aligned with said first set of fan blades;
    said variable bypass turbine fan being positioned outboard of said main core; and
    said variable bypass turbine fan being depowered during a first mode of engine operation and being powered during a second mode of engine operation.

15. The engine according to claim 14, wherein said second set of fan blades rotate at a different speed than said first set of fan blades.

16. The engine according to claim 14, wherein said main core has a centerline and said second set of fan blades have the same centerline.

17. The engine according to claim 14, wherein when said variable bypass turbine fan is in depowered, power used to drive said variable bypass turbine fan is used for other purposes.

18. The engine according to claim 17, wherein said other purposes include powering a suite of sensors.

19. The engine according to claim 17, wherein said other purposes include powering weapon systems.

* * * * *